United States Patent [19]
Everhart et al.

[11] Patent Number: 5,858,503
[45] Date of Patent: Jan. 12, 1999

[54] METHOD OF APPLYING CHEMICAL CHARGE MODIFIERS TO A SUBSTRATE AND ARTICLE THEREOF

[75] Inventors: Dennis Stein Everhart; Kristi Lynn Kiick-Fischer, both of Alpharetta, Ga.

[73] Assignee: Kimberly-Clark Worldwide, Inc., Neenah, Wis.

[21] Appl. No.: 548,855

[22] Filed: Oct. 26, 1995

[51] Int. Cl.$^6$ .................................. B32B 3/24; B32B 9/02
[52] U.S. Cl. ........................ 428/131; 428/339; 428/474.4; 428/480; 428/522; 428/523; 427/337; 427/180; 427/256; 427/384; 427/414; 427/430.1; 427/542; 427/557; 427/560; 427/545; 427/600; 427/338
[58] Field of Search ...................................... 428/131, 339, 428/474.4, 480, 522, 523; 427/337, 180, 256, 384, 414, 430.1, 542, 557, 560, 545, 600, 338

[56] References Cited

U.S. PATENT DOCUMENTS

| | | | |
|---|---|---|---|
| 2,262,770 | 11/1941 | La Piana | 252/8.83 |
| 2,262,771 | 11/1941 | La Piana | 524/704 |
| 2,310,795 | 2/1943 | La Piana et al. | 524/704 |
| 2,453,752 | 11/1948 | La Piana et al. | 427/389.9 |
| 2,979,422 | 4/1961 | Bersin et al. | 427/322 |

(List continued on next page.)

FOREIGN PATENT DOCUMENTS

| | | |
|---|---|---|
| 538901 | 4/1957 | Canada . |
| 0199171 | 10/1986 | European Pat. Off. . |
| 2 564 004 | 5/1984 | France . |
| 2364524 | 7/1974 | Germany . |
| 4108170 | 9/1992 | Germany . |
| 42-16065 | 9/1967 | Japan . |
| 45-34390 | 11/1970 | Japan . |
| 45-34391 | 11/1970 | Japan . |
| 49-48590 | 12/1974 | Japan . |
| 07170904 | 10/1982 | Japan . |
| 425689 | 3/1935 | United Kingdom . |
| 96/28602 | 9/1996 | WIPO . |

OTHER PUBLICATIONS

Theodore H. Meltzer, "Filtration in the Pharmaceutical Industry", Marcel Dekker, Inc., New York, N.Y. 1987, pp. 310–314.

Zaverio M. Ruggeri, "Mechanisms of Shear–Induced Plavelet Adhesion and Aggregation," *Thrombosis and Haemostasis—Journal of the International Society on Thrombosis and Haemostasis*, Jul. 1, 1993, Schattaver Stuttgart, New York, N.Y, 1993, pp. 119–123.

Abstract JP, A, 04 136 268, Derwent Publications Ltd., London, GB, 11 May 1992.

*Textile Research Journal*, "Effect of Quaternized Amphiphilic Peptides on Pilling and Electrostatic Discharge of Wool Fabrics", vol. 64, No. 11, 1 Nov. 1994, pp. 648–652.

*Primary Examiner*—William Watkins
*Attorney, Agent, or Firm*—Karl V. Sidor

[57] ABSTRACT

A method of applying chemical charge-modifiers to a permeable sheet including the steps of: providing a permeable sheet having a plurality of individual exposed surfaces, at least a portion of which having relatively low surface energies; providing an aqueous solution containing amphiphilic macromolecules, the solution having a relatively high surface tension; contacting the solution containing amphiphilic macromolecules under shear stress conditions with the permeable sheet so that at least a portion of the amphiphilic macromolecules are adsorbed onto at least some individual exposed surfaces to form a coated permeable sheet; and contacting the coated permeable sheet with a solution containing chemical charge modifiers to incorporate chemical charge modifiers onto at least a portion of the amphiphilic macromolecules. A chemically charge-modified permeable sheet composed of: a permeable sheet having a plurality of individual exposed surfaces, at least a portion of which having a surface energy of less than about 45 dynes per centimeter; amphiphilic macromolecules adsorbed onto at least some individual exposed surfaces; and chemical charge modifiers incorporated onto at least a portion of the amphiphilic macromolecules.

52 Claims, 3 Drawing Sheets

U.S. PATENT DOCUMENTS

| | | | |
|---|---|---|---|
| 3,104,154 | 9/1963 | Morimoto et al. | 264/182 |
| 3,188,233 | 6/1965 | Powers et al. | 442/327 |
| 3,202,748 | 8/1965 | MorioNake et al. | 264/168 |
| 3,494,775 | 2/1970 | Coscia et al. | 106/155.1 |
| 3,690,925 | 9/1972 | Morris | 156/338 |
| 4,761,161 | 8/1988 | Potschke | 8/543 |
| 5,004,543 | 4/1991 | Pluskal et al. | 210/490 |
| 5,055,316 | 10/1991 | Hoffman et al. | 427/2 |
| 5,085,784 | 2/1992 | Ostreicher | 210/767 |
| 5,151,321 | 9/1992 | Reeves et al. | 428/286 |
| 5,208,075 | 5/1993 | Kroner et al. | 427/389.9 |
| 5,229,172 | 7/1993 | Cahalan et al. | 427/536 |
| 5,260,396 | 11/1993 | Kroner et al. | 527/201 |
| 5,330,537 | 7/1994 | Stewart et al. | 8/94 R |
| 5,462,867 | 10/1995 | Azad et al. | 435/181 |
| 5,494,744 | 2/1996 | Everhart et al. | 427/337 |

METHOD OF APPLYING CHEMICAL CHARGE MODIFIERS TO A SUBSTRATE AND ARTICLE THEREOF

FIELD OF THE INVENTION

This invention relates to a method of applying chemical charge modifiers to a substrate. The invention also relates to a chemically charge modified substrate.

BACKGROUND OF THE INVENTION

Sheets of apertured films, woven fabrics and nonwoven materials are widely used in many types of products such as, for example, personal care products, garments, medical fabrics and the like. Some sheets made from certain inexpensive raw materials could have an even wider range of applications in these products if the sheets could be designed to have enhanced properties or attributes.

For example, polyolefins are widely used in the manufacture of sheets of apertured films, woven fabrics, and nonwoven materials. Many types of polyolefin sheets tend to be hydrophobic and relatively chemically inert. That is, the low surface free energy of polyolefins (e.g., polypropylene) and their relatively chemically inert nature render many unmodified polyolefins ill-suited for providing attributes other than those based on hydrophobic interactions.

In the past, chemical coatings and/or internal additives have been added to sheets of materials to impart desired properties. Many of these coatings and/or additives present problems related to cost, effectiveness, durability and/or the environment.

It has been proposed that biofunctional materials (e.g., proteins) can be deposited from solutions onto different substrates (i.e., sheets of materials) to modify the surface properties of the substrates and/or serve as a functionalized surface that can be chemically reactive. However, many of the economically desirable substrates (e.g., substrates formed of polymers such as polyolefins) have surfaces that are unsuitable for the rapid and inexpensive deposition of biofunctional materials, especially when durable, tightly-bound coatings of satisfactory adherence are desired. If the coatings are not durable, then modifications to the coatings would generally lack durability.

Even if inexpensive, durable, tenacious coatings could be adhered to an economically desirable substrate, coatings composed solely of biofunctional materials may have limitations, especially if the coatings lacked the desired chemical characteristics.

Thus, there is still a need for a simple method of producing a durable and chemically charged modified coating on an unmodified, relatively inert, hydrophobic substrate. A need exists for a practical method of producing a durable and chemically charged modified coating on an unmodified, relatively inert, polyolefin substrate. A need also exists for a chemically charge modified permeable sheet (i.e., a relatively inert, hydrophobic permeable sheet having a durable, chemically charge modified coating). A need also exists for a fibrous and/or apertured film-like material having a durable, chemically charge modified coating. A need also exists for fibrous and/or apertured film-like substrates formed from a relatively inert, hydrophobic material (e.g., a polyolefin) and having a durable, chemically charge modified coating of readily available, inexpensive materials, especially if such a coated material can be produced in a high-speed manufacturing process. Meeting these needs are important since it is both economically and environmentally desirable to substitute relatively complex chemical surface modification and/or functionalization of inexpensive (and often recyclable) substrates with inexpensive, readily available materials.

DEFINITIONS

As used herein, the term "chemical charge modifier" refers to polyvalent cations and/or positively charged particles. Such chemical charge modifiers, when present in a liquid having a dielectric constant sufficient for separate charged particles to exist, can be incorporated or adsorbed onto a negatively charged amphiphilic macromolecule (e.g., amphiphilic protein) coating on a substrate to modify the coating so that cationic species and/or positively charged particles are present at the surface of the coating under the appropriate conditions. Exemplary chemical charge modifiers include, but are not limited to, $Ca^{2+}$, $Al^{3+}$, $Bi3+$ ions, and $AlO(OH)$, $Bi(OH)_3$ and iron/magnesium(Fe/Mg) particles. Generally speaking, when the chemical charge modifier/ amphiphilic macromolecule (e.g., amphiphilic protein) coated substrate is in contact with aqueous liquid having a pH above the isoelectric point of the amphiphilic macromolecule (e.g., amphiphilic protein) component, cationic species and/or positively charged particles may be adsorbed via electrostatic or electrokinetic interactions between the negatively charged amphiphilic macromolecule coating and positively charged chemical charge modifier.

As used herein, the term "chemically charge-modified" refers to the incorporation of chemical charge modifiers (e.g, polyvalent cations or positively charged particles) onto an amphiphilic macromolecule (e.g., amphiphilic protein) coating deposited on a relatively inert, hydrophobic substrate such as, for example, a polyolefin substrate. Generally speaking, charge modification occurs when the chemical charge modifier/amphiphilic macromolecule (e.g., amphiphilic protein) coated substrate is in contact with aqueous liquid having a pH above the isoelectric point of the amphiphilic macromolecule (e.g., amphiphilic protein) component.

As used herein, the term "amphiphilic protein" refers to proteins having both hydrophobic regions and hydrophilic regions. For example, amphiphilic proteins may be selected from classes of globular and/or random coil proteins. As another example, amphiphilic proteins may be milk proteins. As a further example, amphiphilic proteins may include proteins such as those found in bovine milk including, but not limited to, various caseins and whey proteins.

As used herein, the term "relatively low surface energy" refers to surface energies (i.e., surface free energies) attributed to materials that are not generally considered to be water wettable. Generally speaking, such materials have a surface energy of less than about 45 dynes per centimeter (dynes/cm) as determined in accordance with critical surface tension of wetting techniques described by Bennet, M. K. and Zisman, W. A.; *Relation of Wettability by Aqueous Solutions to the Surface Constitution of Low Energy Solids*; J. Phys. Chem., pps. 1241–1246, Volume 63 (1959). Many such materials have a surface energy of ranging from about 29 to about 35 dynes/cm.

As used herein, the term "relatively high surface tension" refers to a level of attractive force in a liquid exerted by the molecules below the surface upon those at the surface/air interface, resulting from the high molecular concentration of a liquid compared to the low molecular concentration of a gas. Relatively high surface tensions are characteristic of, for example, some aqueous liquids and/or aqueous solutions having little or no added surfactants or other agents that reduce the surface tension. Surface tension may be determined from measurements of the contact angle of sessile drops using a goniometer such as, for example goniometer model No. 100-00 115 (equipped with videocamera) available from Rame-Hart, Inc., or by methods such as, for example, DuNouy ring methods. Relatively high surface tension for the purposes of the present invention is a surface tension of at least about 45 dynes/cm. Desirably, the surface tension is greater than 45 dynes/cm.

As used herein, the term "shear stress conditions" refers to conditions under which a shearing stress (force per unit area) is applied to a liquid. As an example, for a given volume of a liquid, increasing the rate at which the liquid penetrates or passes through a relatively permeable sheet such as, for example, a polyolefin nonwoven fibrous web (i.e., by decreasing the exposure time) results in an increased shear stress at the fiber/liquid interface. In this case, a long exposure time generally indicates little or no shear stresses and a short exposure time generally indicates shear stress conditions. Shear stress conditions may occur in liquid flow having generally laminar or turbulent flow characteristics.

As used herein, the term "adsorbed" refers to a type of adhesion which takes place at the surface of a solid in contact with another medium (e.g., a liquid), resulting in the accumulation or increased concentration of molecules from that medium in the immediate vicinity of the surface.

As used herein, the term "nonwoven web" refers to a web that has a structure of individual fibers or filaments which are interlaid, but not in an identifiable repeating manner. Nonwoven webs have been, in the past, formed by a variety of processes known to those skilled in the art such as, for example, meltblowing, spunbonding, wet-forming and various bonded carded web processes.

As used herein, the term "spunbonded web" refers to a web of small diameter fibers and/or filaments which are formed by extruding a molten thermoplastic material as filaments from a plurality of fine, usually circular, capillaries in a spinnerette with the diameter of the extruded filaments then being rapidly reduced, for example, by non-eductive or eductive fluid-drawing or other well known spunbonding mechanisms. The production of spunbonded nonwoven webs is illustrated in patents such as Appel, et al., U.S. Pat. No. 4,340,563.

As used herein, the term "meltblown fibers" means fibers formed by extruding a molten thermoplastic material through a plurality of fine, usually circular, die capillaries as molten threads or filaments into a high-velocity gas (e.g. air) stream which attenuates the filaments of molten thermoplastic material to reduce their diameters, which may be to microfiber diameter. Thereafter, the meltblown fibers are carried by the high-velocity gas stream and are deposited on a collecting surface to form a web of randomly dispersed meltblown fibers. The meltblown process is well-known and is described in various patents and publications, including NRL Report 4364, "Manufacture of Super-Fine Organic Fibers" by V. A. Wendt, E. L. Boone, and C. D. Fluharty; NRL Report 5265, "An Improved Device for the Formation of Super-Fine Thermoplastic Fibers" by K. D. Lawrence, R. T. Lukas, and J. A. Young; and U.S. Pat. No. 3,849,241, issued Nov. 19, 1974, to Buntin, et al.

As used herein, the term "microfibers" means small diameter fibers having an average diameter not greater than about 100 microns, for example, having a diameter of from about 0.5 microns to about 50 microns, more specifically microfibers may also have an average diameter of from about 1 micron to about 20 microns. Microfibers having an average diameter of about 3 microns or less are commonly referred to as ultra-fine microfibers. A description of an exemplary process of making ultra-fine microfibers may be found in, for example, U.S. Pat. No. 5,213,881, entitled "A Nonwoven Web With Improved Barrier Properties".

As used herein, the term "apertured film-like material" refers to a generally flat or planar layer of material which has been punched, drilled, apertured, stretched, perforated, embossed, patterned, crinkled and/or otherwise processed so that it has relatively gross or visible openings with or without a pattern or texture in the thickness dimension (i.e., Z-direction) of the material. Exemplary apertured film-like materials include, but are not limited to, perf-embossed films, textured apertured films, reticulated apertured films, contoured apertured films, film-nonwoven apertured laminates, and expanded plexi-filamentary films.

As used herein, the term "sheet" refers to a material that can be a woven fabric, knit fabric, nonwoven fabric or film-like material (e.g., an apertured film-like material).

As used herein, the term "solution" refers to any relatively uniformly dispersed mixture of one or more substances (e.g., solute) in one or more other substances (e.g., solvent). Generally speaking, the solvent may be a liquid such as, for example, water and/or mixtures of liquids. The solvent may contain additives such as salts, acids, bases, viscosity modifiers, preservatives, disinfectants, anti-microbial agents and the like. The solute may be any material adapted to uniformly disperse in the solvent at the appropriate level, (e.g., ionic level, molecular level, colloidal particle level or as a suspended solid). For example, a solution may be a uniformly dispersed mixture of ions, of molecules, of colloidal particles, or may even include mechanical suspensions.

As used herein, the terms "permeable" and "permeability" refer to the ability of a fluid, such as, for example, a gas to pass through a particular porous material. Permeability may be expressed in units of volume per unit time per unit area, for example, (cubic feet per minute) per square foot of material (e.g., (ft$^3$/minute/ft$^2$)). Permeability may be determined utilizing a Frazier Air Permeability Tester available from the Frazier Precision Instrument Company and measured in accordance with Federal Test Method 5450, Standard No. 191A, except that the sample size was 8"×8" instead of 7"×7" . Although permeability is generally expressed as the ability of air or other gas to pass through a permeable sheet, sufficient levels of gas permeability may correspond to levels of liquid permeability to enable the practice of the present invention. For example, a sufficient level of gas permeability may allow an adequate level of liquid to pass through a permeable sheet with or without assistance of a driving force such as, for example, an applied vacuum or applied gas pressure. Generally speaking, a permeable sheet may have a permeability of at least about 20 cubic feet per minute per square foot (cfm/ft$^2$), as measured for a substantially dry sheet prior to processing. It is contemplated that a sheet having a permeability of less than about 20 cfm/ft$^2$, as measured for a substantially dry sheet prior to processing, could be used successfully in the practice of the present invention with (or in some cases without) assistance of a driving force such as, for example, an applied vacuum or applied gas pressure. As an example, a permeable sheet may have a permeability of from about 25 to over 200 cfm/ft$^2$, as measured for a substantially dry sheet prior to processing. As another example, a permeable sheet may have a permeability of from about 35 to about 150 cfm/ft$^2$, as measured for a substantially dry sheet prior to processing.

As used herein, the term "consisting essentially of" does not exclude the presence of additional materials which do not significantly affect the desired characteristics of a given composition or product. Exemplary materials of this sort would include, without limitation, pigments, antioxidants, stabilizers, surfactants, waxes, flow promoters, particulates or materials added to enhance processability of a composition.

SUMMARY OF THE INVENTION

The problems described above are addressed by the present invention which is directed to a method of applying chemical charge modifiers to a permeable sheet. The method includes the steps of: 1) providing a permeable sheet having a plurality of individual exposed surfaces, at least a portion of which having relatively low surface energies; 2) providing an aqueous solution containing amphiphilic macromolecules, the solution having a relatively high surface tension; 3) contacting the solution containing amphiphilic macromolecules under shear stress conditions with the permeable sheet so that at least a portion of the amphiphilic macromolecules are adsorbed onto at least some individual exposed surfaces to form a coated permeable sheet; and 4) contacting the coated permeable sheet with a liquid containing chemical charge modifiers to incorporate chemical charge modifiers onto at least a portion of the amphiphilic macromolecules.

The liquid containing chemical charge modifiers may be a solution or suspension of polyvalent cations and positively-charged particles. The polyvalent cations may include, but are not limited to, $Ca^{2+}$, $Al^{3+}$, and $Bi^{3+}$. If the chemical charge modifiers are positively-charged particles, the positively-charged particles may be single metal hydroxides, mixed metal hydroxides and sol-gels. For example, the single metal hydroxides may be $Al(OH)_3$ and $Bi(OH)_3$. As another example, the mixed metal hydroxides may be co-depositions of $Fe(OH)_3$ and $Mg(OH)_2$. It is contemplated that appropriately charged microencapsulated materials, latex particles, polystyrene particles, clays and/or zeolites may also be used in the practice of the present invention.

Generally speaking, the concentration of chemical charge modifiers in the liquid (e.g., in the solution or suspension) may vary. As an example, the concentration of chemical charge modifiers in the liquid may range from about 0.005 to about 5 weight percent. As another example, the concentration of chemical charge modifiers in the liquid may range from about 0.05 to about 2 weight percent. As still yet another example, the concentration of chemical charge modifiers in the liquid may range from about 0.5 to about 1 weight percent. If the concentration of chemical charge modifiers has an impact on the liquid's viscosity, it is desirable that the viscosity of the liquid containing the chemical charge modifiers be close to that of water (e.g., about 1 centipoise).

According to the invention, the aqueous solution containing amphiphilic macromolecules has a relatively high surface tension. Desirably, the surface tension of the aqueous solution is about 45 dynes per centimeter or greater. More desirably, the surface tension of the aqueous solution may range from about 50 dynes per centimeter to about 70 dynes per centimeter.

Generally speaking the amphiphilic macromolecules have both hydrophobic regions and hydrophilic regions. Useful amphiphilic macromolecules include, but are not limited to, amphiphilic proteins. The amphiphilic proteins may be selected from classes of globular proteins and/or random coil proteins. For example, the amphiphilic proteins may be milk proteins. Desirably, the amphiphilic proteins may include proteins such as those found in bovine milk including, for example, various caseins and whey proteins.

According to the present invention, the aqueous solution may have a concentration of amphiphilic macromolecules (e.g., concentration of amphiphilic proteins) of less than about 10 percent, by weight. Desirably, the aqueous solution has an amphiphilic macromolecule (e.g., amphiphilic protein) concentration greater than about 0.01 up to about 6 percent by weight.

In an aspect of the present invention, the aqueous solution may be exposed to shear stress conditions such that it has a Reynold's number of at least about 200. For example, the aqueous solution may be exposed to shear stress conditions such that it has a Reynold's number of at least about 400. In another aspect of the invention, the aqueous solution may be in the form of a foam (i.e., a colloidal system of gas dispersed in a liquid) when contacted with the matrix of fibrous material.

The method of the present invention may further include the step of recontacting a solution containing amphiphilic macromolecules (e.g., amphiphilic proteins) under shear stress conditions with the permeable sheet so that an additional portion of amphiphilic macromolecules (e.g., amphiphilic proteins) are adsorbed onto at least some individual exposed surfaces prior to contacting the coated permeable sheet with the liquid containing chemical charge modifiers.

In the practice of the present invention amphiphilic macromolecules (e.g., amphiphilic proteins) and chemical charge modifiers may be adsorbed onto at least some individual exposed surfaces thereby defining a patterned coating on the permeable sheet. The present invention also encompasses a method wherein amphiphilic macromolecules (e.g., amphiphilic proteins) and chemical charge modifiers are adsorbed onto a substantial portion of individual exposed surfaces having relatively low surface energies to define a relatively uniform coating. In another aspect of the invention, amphiphilic macromolecules (e.g., amphiphilic proteins) may be adsorbed onto at least some individual exposed surfaces to define a gradient distribution of amphiphilic macromolecules and chemical charge modifiers along at least one dimension of the permeable sheet.

The method of the present invention further includes the step of adding one or more secondary materials to the chemically charge-modified permeable sheet. For example, the secondary materials may include particulates and or fibrous material. These materials may have a characteristic or applied charge (e.g., a positive or negative charge) or may be charge modified materials. Suitable fibrous material may include pulp, synthetic and/or natural fibers and the like. Suitable particulate material may include activated carbon, latexes, polystyrene particulates, zeolites, clays, superabsorbent particulates, microencapsulated particulates and the like.

The present invention encompasses a chemically charge-modified permeable sheet including: 1) a permeable sheet having individual exposed surfaces, at least a portion of which having relatively low surface energies (e.g., less than about 45 dynes per centimeter); 2) amphiphilic macromolecules adsorbed onto at least some individual exposed surfaces; and 3) chemical charge modifiers incorporated onto at least a portion of the amphiphilic macromolecules.

The permeable sheet may be a matrix of fibrous material. The matrix of fibrous material may be, but is not limited to, one or more woven fabrics, knit fabrics, nonwoven fabrics and combinations of the same. The matrix of fibrous material may further include one or more secondary materials.

The matrix of fibrous material may be a nonwoven fabric such as, for example, nonwoven webs of meltblown fibers, nonwoven webs of continuous spunbond filaments and bonded carded webs. In an embodiment of the invention, the nonwoven web of meltblown fibers may further include one or more secondary materials selected from the group consisting of textile fibers, wood pulp fibers, particulates and superabsorbent materials.

The fibrous material may be formed from a thermoplastic polymer. For example, thermoplastic polymer may be selected from polyolefins, polyamides and polyesters. The polyolefin may be selected from polyethylene, polypropylene, polybutene, ethylene copolymers, propylene copolymers, and butene copolymers and blends of the same.

In one aspect of the invention, at least a portion of the fibrous material may be a multi-component or bi-component material selected from multi-component or bi-component fibers and multi-component or bi-component filaments. It is contemplated that at least a portion, if not all, of these fibers may be textured by use of an expanding agent.

The permeable sheet may be an apertured, film-like material. The apertured, film-like material may include, but is not limited to perf-embossed films, one or more textured apertured films, reticulated apertured films, contoured apertured films, film-nonwoven apertured laminates, expanded plexi-filamentary films and combination of the same. The apertured film-like material may further include one or more secondary materials.

The apertured film-like material may be formed from a thermoplastic polymer. For example, the thermoplastic polymer may be selected from polyolefins, polyamides and polyesters. If the polymer is a polyolefin, it may be selected from polyethylene, polypropylene, polybutene, ethylene copolymers, propylene copolymers, and butene copolymers and blends of the same. The permeable sheet may be composed of combinations of one or more matrices of fibrous material and apertured, film-like material.

According to the present invention, the chemically charge-modified permeable sheet may have a basis weight of from about 6 to about 400 grams per square meter (gsm). For example, the chemically charge-modified sheet may have a basis weight of from about 12 to about 250 grams per square meter. As a further example, the chemically charge-modified sheet may have a basis weight of from about 17 to about 102 grams per square meter.

The present invention encompasses a multi-layer material including at least two layers of the chemically charge-modified sheet described above. The present invention also encompasses a multi-layer material including at least one layer of the chemically charge-modified sheet described above and at least one other layer. The other layer may be selected from woven fabrics, knit fabrics, bonded carded webs, continuous spunbond filament webs, meltblown fiber webs, films, apertured films, and combinations thereof.

In an aspect of the present invention, the chemically charge-modified permeable sheet may include amphiphilic macromolecules and chemical charge-modifiers adsorbed onto at least some individual exposed surfaces to define a gradient distribution of coating along at least one dimension of the permeable sheet. In one embodiment, the gradient distribution of coating may be along at least two dimensions of the permeable sheet. The coating of amphiphilic macromolecules and charge-modifiers may define a pattern on the permeable sheet. The permeable sheet may include a coating of amphiphilic macromolecules and chemical charge-modifiers that is present in only discrete portions of the permeable sheet.

In one aspect of the invention, the coating of amphiphilic macromolecules and chemical charge-modifiers may be made up of multiple layers. In another aspect of the invention, the thickness of the coating may range from about 1 nanometer to about 1 micron. For example, the thickness of the coating may range from about 5 nanometers to about 900 nanometers. As a further example, the thickness of the coating may range from about 10 nanometers to about 500 nanometers.

According to the present invention, the chemically charge-modified permeable sheet may have a critical surface tension of wetting greater than about 45 dynes per centimeter. For example, the chemically charge-modified sheet may have a critical surface tension of wetting greater than about 50 dynes per centimeter. As a further example, the chemically charge-modified sheet may have a critical surface tension of wetting greater than about 60 dynes per centimeter.

DETAILED DESCRIPTION OF THE INVENTION

Figure 1:
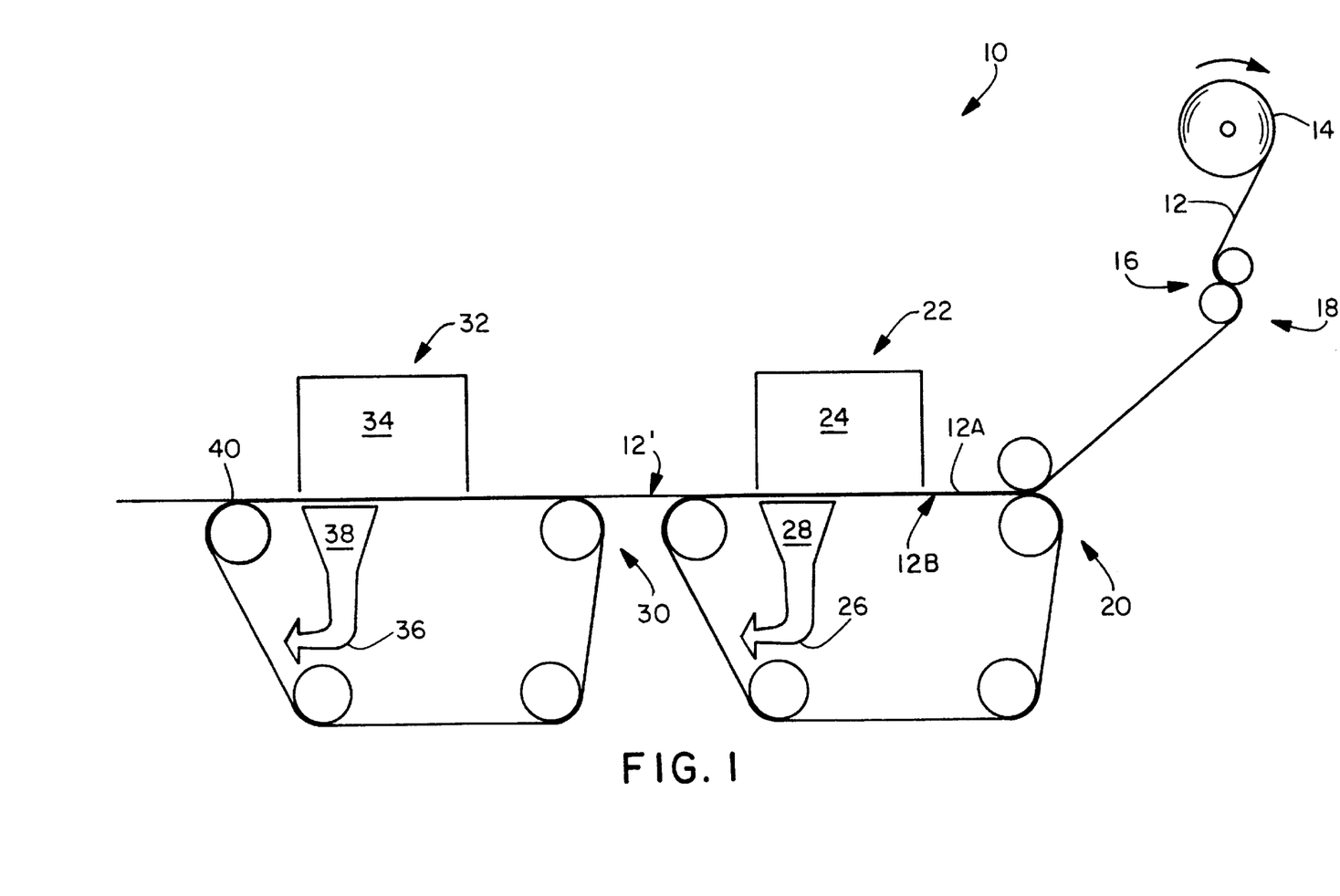
FIG. 1 is an illustration of an exemplary method of applying a chemical charge modifiers to a permeable sheet.

Referring to the drawing and in particular to FIG. 1, there is shown, not necessarily to scale, at 10 an exemplary method of applying chemical charge-modifiers to individual exposed surfaces of a permeable material (e.g., a matrix of fibrous material or an apertured film-like material). While the invention will be described in connection with desired or preferred embodiments, it will be understood that it is not intended to limit the invention to those embodiments.

According to the present invention, a permeable sheet 12 is unwound from a supply roll 14 and travels in the direction indicated by the arrow associated therewith as the supply roll 14 rotates in the direction of the arrows associated therewith. The permeable sheet 12 may be formed by one or more sheet making processes and passed directly into the process 10 without first being stored on a supply roll 14. Exemplary sheet-making processes include processes such as meltblowing processes, spunbonding processes, bonded-carded web-making processes, wet-laying processes, apertured film-forming processes, and the like.

The permeable sheet may be passed through a pre-treatment station to modify the structure of the sheet. For example, the sheet may be calendered with a flat roll, point bonded or pattern bonded roll and/or aperturing roll in order to achieve desired strength, functional and/or textural properties. Although it is not necessary for the successful deposition of the protein coating on the permeable sheet in the practice of the present invention, it is contemplated that at least a portion of a surface of the sheet could be modified by various known surface modification techniques prior to entering the continuous process of coating individual exposed surfaces of the permeable sheet with amphiphilic proteins. Exemplary surface modification techniques include, for example, chemical etching, chemical oxidation, ion bombardment, plasma treatments, flame treatments, heat treatments, and/or corona discharge treatments.

The permeable sheet may be an apertured film-like material. For example, the apertured film-like material may be selected from perf-embossed films, textured apertured films, reticulated apertured films, contoured apertured films, film-nonwoven apertured laminates, and expanded plexi-filamentary films.

Alternatively and/or additionally the permeable sheet may be a matrix of fibrous material such as one or more woven fabrics, knit fabrics or nonwoven fabrics. That is, the permeable sheet may be either an apertured film-like material, a matrix of fibrous material or any suitable combination of the same. If the permeable sheet is a nonwoven fabric, it may be a nonwoven fibrous web such as, for example, a bonded carded web, spunbond web, web of meltblown fibers, fibrous batt, fibrous mat and/or multi-ply fibrous web containing the same type of fibrous web or a multi-ply fibrous web containing different types of fibrous webs. If the permeable sheet is a web of meltblown fibers, it may include meltblown microfibers. These nonwoven webs may be formed from thermoplastic polymers or thermoset polymers. If the nonwoven web is formed from a polyolefin, the polyolefin may be polyethylene, polypropylene, polybutene, ethylene copolymers, propylene copolymers and butene copolymers. The fibers and/or filaments may be formed from blends that contain various pigments, additives, strengthening agents, flow modifiers and the like. Such fabrics are described in U.S. Pat. Nos. 4,041,203, 4,374,888, and 4,753,843, the contents of which are incorporated herein by reference. Those patents are assigned to the Kimberly-Clark Corporation, the assignee of the present invention.

The permeable sheet may be a nonwoven web that may also be a composite material made of a mixture of two or more different fibers or a mixture of fibers and particulates. Such mixtures may be formed by adding fibers and/or particulates to the gas stream in which meltblown fibers are carried so that an intimate entangled commingling of meltblown fibers and other materials, e.g., wood pulp, staple fibers and particulates such as, for example, activated carbon, silica, and/or hydrocolloid (hydrogel) particulates commonly referred to as superabsorbent materials, occurs prior to collection of the meltblown fibers upon a collecting device to form a coherent web of randomly dispersed meltblown fibers and other materials such as disclosed in U.S. Pat. Nos. 4,100,324, and 5,350,624, the disclosure of which is hereby incorporated by reference.

If the permeable sheet is a nonwoven web, the fibrous material in the nonwoven web may be joined by interfiber bonding to form a coherent web structure. Interfiber bonding may be produced by entanglement between individual meltblown fibers, carded fibers, spunbond filaments and/or other fibrous materials. Some fiber entangling is inherent in the meltblown process, bonding-carding process and/or spunbond process but may be generated or increased by processes such as, for example, hydraulic entangling or needlepunching. Alternatively and/or additionally a bonding agent may be used to increase the desired bonding. If at least a portion of the fibrous material in the permeable sheet is cellulosic fibrous material, some interfiber bonding may be attributable to "paper" bonding.

The permeable sheet (either before or after processing) may have a basis weight ranging from about 6 gsm to about 400 gsm. For example, the permeable sheet may have a basis weight ranging from about 12 gsm to about 250 gsm. Desirably, the permeable sheet may have a basis weight ranging from about 17 gsm to about 102 gsm. It is contemplated that, after processing, any number of treated permeable sheets may be joined together or treated permeable sheets may be joined to other materials to form a consolidated material that may have a basis weight within the range of 6 gsm to 400 gsm or even greater (e.g., 400 gsm or more).

The permeable sheet 12 passes through the nip 16 of an S-roll arrangement 18 in a reverse-S path. From the S-roll arrangement 18, the permeable sheet 12 passes to a means for continuously advancing 20 the permeable sheet throughout the process. Generally speaking, the means for continuously advancing 20 the permeable sheet may be, for example, a moving foraminous belt, a permeable fabric, netting, webbing or the like. It is contemplated that the permeable sheet 12 may be self-supporting and need not be transported on a moving belt.

The permeable sheet 12 then passes under a means or device for providing an aqueous solution containing amphiphilic macromolecules. Generally speaking, the amphiphilic macromolecules may be amphiphilic proteins. The aqueous solution of amphiphilic macromolecules (e.g., amphiphilic proteins) should have a relatively high surface tension (i.e., the aqueous solution of amphiphilic proteins should have a surface tension of about 45 dynes/cm or greater). The means for providing an aqueous solution containing amphiphilic macromolecules distributes the aqueous solution substantially across and onto a first surface 12A of the continuously advancing permeable sheet.

According to the invention, the means or device for depositing the aqueous solution containing amphiphilic macromolecules deposits the amphiphilic macromolecules at conditions under which a shearing stress is applied to the aqueous solution. A description of an exemplary process of applying an amphiphilic macromolecule (e.g., amphiphilic protein) coating to a substrate may be found in U.S. patent application Ser. No. 08/321,485, now U.S. Pat. No. 5,494,744, entitled "Method of Applying a Protein Coating to a Substrate and Article Thereof", which is assigned to the assignee of the present application, the contents of which are incorporated by reference in their entirety.

The liquid depositing device may be composed of at least one liquid distribution element 24. For example, multiple liquid distribution elements 24 may be arranged in series. The liquid distribution element 24 may be a spillway adapted to produce a stream or shower of the aqueous solution of amphiphilic macromolecules so that it is under shear stress conditions as it contacts the permeable sheet. The liquid distribution element 24 may also be one or more nozzles and/or orifices which sprays, squirts, jets or otherwise conveys the aqueous solution so that it is under shear stress conditions as it contacts the permeable sheet. It is contemplated that the liquid distribution element may be composed of a reservoir of the aqueous solution of amphiphilic macromolecules designed so that the permeable sheet passes over either an interior or exterior surface across one or more openings or orifices which provides contact with the aqueous solution of amphiphilic macromolecules under shear stress conditions. It is also contemplated that the liquid distribution element may be a reservoir of the aqueous solution into which the permeable sheet passes at a rate of travel through the reservoir such that shear stress conditions are created at the interface between one or more surfaces of the permeable sheet and the aqueous solution.

In one embodiment of the invention, the liquid distribution element may be composed of a reservoir and a spillway adapted to produce a relatively uniform distribution of the aqueous solution to produce a layer of liquid on top of the permeable sheet. A vacuum may be applied simultaneously with the deposition of the aqueous solution to generate shear stress conditions in the aqueous solution as it passes through the permeable sheet. It is contemplated that application of vacuum may be delayed so that it is not simultaneous with the deposition of aqueous solution. Generally speaking, the vacuum level should be sufficient to draw the aqueous solution through the permeable sheet under shear stress conditions. As an example, the vacuum level may be greater than about 60 inches of water. As another example, the vacuum level may range from about 60 to about 270 or more inches of water.

As discussed above, the means for applying a vacuum 26 to the second surface of the continuously advancing permeable sheet are located near the liquid deposition element 24. Generally speaking, the vacuum means 26 may be composed of at least one vacuum element 28. Multiple vacuum elements 28 may be arranged in series. The vacuum element 28 may be a conventional vacuum channel or groove such as, for example, a vacuum slot. The vacuum means 26 should be adapted to handle flow rates/volumes of aqueous solution generally corresponding to the flow rates/volumes out of the liquid deposition means 22.

The liquid deposition means 22 and the vacuum means 26 may be configured to deposits the aqueous solution on the permeable sheet 12 in the general form of shapes, patterns, figures, alpha-numeric characters, words, spots, pictures and the like. The vacuum means may contain a variety of configurations such as, for example, unevenly spaced vacuum slots or slits (or shaped openings) designed to produce a gradient deposition. It is contemplated that the liquid deposition means 22 and the vacuum means 26 could be configured to provide intermittent deposition of aqueous solution on the permeable sheet so that step-wise or unit-wise operation may be achieved.

Upon application of the vacuum to the second surface 12B of the permeable sheet, a substantial portion of the aqueous solution containing amphiphilic macromolecules is drawn from the first surface 12A and substantially through the permeable sheet. This passage of the aqueous solution through the permeable sheet is generally thought to generate the shear stress conditions necessary to provide appropriate levels of adsorption of a portion of the amphiphilic macromolecules onto the individual exposed surfaces of the permeable sheet.

Generally speaking, evacuation of the aqueous solution of amphiphilic macromolecules under vacuum levels described above to achieve suitable shear stress conditions may be accomplished with a sheet having a permeability of at least about 20 cfm/ft$^2$, as measured for a substantially dry sheet prior to being processed. For example, the permeability of the sheet may range from about 50 to over 200 cfm/ft$^2$, as measured for a substantially dry sheet prior to being processed. If a sheet has inadequate permeability, the aqueous solution may puddle or pool on the first surface and may be non-uniformly concentrated, absorbed or diffused through the sheet. In such cases, it is generally thought that satisfactory conditions could be achieved by applying higher levels of vacuum, higher pressures and/or levels of force to the aqueous solution of amphiphilic macromolecules contacting the permeable sheet and/or an applied gas pressure to drive the aqueous solution through the sheet thereby generating the appropriate sheer stress conditions.

According to the present invention, it may be desirable to wash or rinse the permeable sheet 12 after being contacted with the aqueous solution of amphiphilic macromolecules. Washing or rinsing (not shown) the coated permeable sheet should be carried out using an aqueous liquid having a relatively high surface tension (e.g., water). Although the volume of the liquid wash or rinse may vary greatly, it has been found that a volume of liquid rinse generally similar to the volume of aqueous solution of amphiphilic macromolecules may be satisfactory (e.g., from about 0.5 to about 1.5 times the volume of amphiphilic macromolecule solution).

In general, the aqueous solution of amphiphilic macromolecules should be able to flow freely. For example, the aqueous solution of amphiphilic macromolecules (e.g., amphiphilic proteins) may have a viscosity of from about 0.1 to about 5 centipoise. Lower viscosity solutions appear to be desirable. However, it is contemplated that more viscous aqueous solutions could be used in the practice of the present invention provided that appropriate shear stress conditions can be maintained by techniques including, but not limited to, applying higher levels of vacuum, higher pressures and/or levels of force to the aqueous solution and/or an applied gas pressure.

According to one embodiment of the invention, a substantial portion of the aqueous solution of amphiphilic macromolecules may be drawn through the sheet in less than about 1 or 2 seconds to generate the appropriate shear stress conditions for adsorption. For example, a substantial portion of the aqueous solution may be drawn through the permeable sheet in less than about 0.1 second. As a further example, a substantial portion of the aqueous solution may be drawn through the permeable sheet in less than about 0.01 second. As yet another example, a substantial portion of the aqueous solution may be drawn through the permeable sheet in less than about 0.001 second. It is thought that appropriate shear stress conditions for adsorption of amphiphilic macromolecules may be encountered when the flow of aqueous solution has a Reynold's number of at least about 200. For example, the flow of aqueous solution may have a Reynold's number of at least about 400.

Desirably, the amphiphilic macromolecules are amphiphilic proteins. Generally speaking, the amphiphilic proteins may be selected from classes of globular proteins and/or random coil proteins. For example, the amphiphilic proteins may be milk proteins. Desirably, the amphiphilic proteins may include proteins such as those found in bovine milk including, for example, various caseins and whey proteins.

According to the present invention, milk proteins (e.g., bovine milk proteins) have been identified as well-suited to provide a durable and chemically reactive surface modification when applied to a permeable substrate as describe above. The proteins in milk can be described as generally amphiphilic (i.e., they have both hydrophilic and hydrophobic regions) and tend to be surface active. Beta-casein (β-casein), one of the major milk proteins, is so surface active that it is used as an emulsifier in various food products.

Because these proteins are amphiphilic, they have hydrophobic regions that, in the practice of the present invention, can be readily adsorbed to a polyolefin surface and hydrophilic regions which will orient toward aqueous solution. A wide variety of applications exists for this type of modified surface. For example, the hydrophilic portions of the proteins will impart wettability to relatively hydrophobic substrates (e.g., polyolefin or more particularly, polypropylene substrates) and may serve as a surface primer for attaching other biologically relevant macromolecules such as chitosan and hyaluronic acid.

Although the inventors should not be held to a particular theory of operation, it is thought that certain interfacial free energy phenomena and the application of shear stress to proteins in aqueous solution tend to drive the protein coating (i.e., protein adsorption) on the permeable sheet. Generally speaking, random coil proteins (e.g., β-casein) adapt a disordered conformation which minimizes contact of the hydrophobic amino acids of the proteins with water. The overall free energy of the solution is minimized when these hydrophobic areas of the proteins self-associate to screen themselves from the aqueous environment. When exposed, under shear stress conditions, to a permeable sheet having individual exposed surfaces (some of which having relatively low surface energies) such as, for example, a polyolefin nonwoven, the hydrophobic amino acid groups will have a tendency to associate with the hydrophobic fiber surface, leaving hydrophilic groups oriented toward the aqueous solution and thereby lowering the interfacial energy. These hydrophilic amino acids are thought to be responsible for the improved water wettability of the macromolecule (e.g., protein) modified polyolefin. Although the inventors should not be held to a particular theory of operation, this orientation of the protein at the surface is thought to be the energetically favored state, and explains the tenacious character of the macromolecule (e.g., protein) coatings on the surface (i.e., fiber or film surface).

The application of shear stress to proteins in aqueous solution distorts their thermodynamically favored equilibrium conformation, exposing normally shielded hydrophobic groups to the aqueous solution. This produces an energetically unfavored interface. When in close proximity to a nonwoven fiber surface, these hydrophobic groups are attracted to the hydrophobic polyolefin substrate, and intermolecular hydrophobic attractions predominate. Adsorption is promoted by a decrease in interfacial free energy. The increase in the number of hydrophobic groups exposed under conditions of increasing shear (i.e. more structural distortion) results in an increased tendency for protein deposition. Without shear distortion, the number of hydrophilic/hydrophobic interactions would be minimized and the chemical nature of the coating would be less desirable for substantive charge modification.

The permeable sheet containing a coating of amphiphilic macromolecules (e.g., amphiphilic proteins)—called the coated permeable sheet 12' leaves the liquid deposition means 22 and passes to a second means for continuously advancing 30 the coated permeable sheet 12'. The second means for continuously advancing 30 the coated permeable sheet 12' may be similar to the first means for continuously advancing 20 the permeable sheet 12 or may even be unnecessary if the first means for continuously advancing 20 the permeable sheet is extended to run through the entire process. It is also contemplated that the permeable sheet 12 may be self supporting and need not be transported on a moving belt.

The coated permeable sheet 12' passes through a means or device 32 for contacting the sheet 12' with a liquid containing chemical charge modifiers. The liquid contacting or depositing device 32 may be composed of at least one liquid distribution element 34. For example, multiple liquid distribution elements may be arranged in series. The liquid distribution element 34 may be similar to the liquid distribution element 24. For example, it may be a spillway adapted to produce a stream or shower, or one or more nozzles and/or orifices which sprays, squirts, jets or otherwise conveys the liquid containing the chemical charge modifiers. It is contemplated that the liquid distribution element 34 may be composed of a reservoir of the liquid containing chemical charge modifiers designed so that the coated permeable sheet 12' passes over either an interior or exterior surface across one or more openings or orifices which provides contact with the liquid. It is also contemplated that the liquid distribution element may be a reservoir of the aqueous solution into which the coated permeable sheet 12' such as, for example, a dip tank or trough. A variety of other reservoir and spillway configurations are contemplated and could generally be determined by one of ordinary skill in the art.

The liquid containing chemical charge modifiers contacts the sheet and the chemical charge modifiers adsorb or become incorporated onto the amphiphilic macromolecule (e.g., amphiphilic protein) coating. For example, when the chemical charge modifiers are polyvalent cations and/or positively charged particles in a liquid having a dielectric constant sufficient for separate charged particles to exist, at least a portion of the cations or positively charged particles become incorporated onto a negatively charged amphiphilic macromolecule (e.g., amphiphilic protein) coating on the coated permeable sheet 12 to yield a chemically charge-modified permeable sheet 40.

It is desirable that the pH of the liquid containing cationic and/or positively charged chemical charge modifiers should be above the isoelectric point of the amphiphilic macromolecule (e.g., amphiphilic protein) coating on the coated permeable sheet 12' to maximize charge modification. Generally speaking, the greater the pH above the isoelectric point, the greater the number of sites of negative charge will be present on the amphiphilic macromolecule coating yielding a more extensive charge modification. But even if the pH is at or slightly below the isoelectric point, there may generally be sufficient regions of negative charge to provide adequate charge modification.

By keeping the pH above the isoelectric point of the amphiphilic macromolecule (e.g., amphiphilic protein) coating, the coating should generally have a net negative charge or localized regions of negative charge when the liquid containing oppositely charged chemical charge modifiers contacts the coating. For example, the isoelectric point of milk protein coatings may be present in an aqueous solution of having a pH of about 4. In such case, the liquid containing oppositely charged chemical charge modifiers may have a pH above 4.

Of course, it is contemplated that the pH of the aqueous solution may be below the isoelectric point of the amphiphilic macromolecule (e.g., amphiphilic protein) coating so that the coating is positively charged when the liquid containing oppositely charged chemical charge modifiers (i.e., negatively charged chemical charged modifiers) contacts the coating.

The liquid containing the chemical charge modifiers may be a solution, a suspension or the like. For example, the liquid containing the chemical charge modifiers may be a solution of polyvalent cations and/or positively charged particles. As another example, the liquid containing the chemical charge modifiers may be a suspension of positively charged particles, positively-charged microencapsulated materials, positively-charged latex particles, positively-charged polystyrene particles, positively-charged clays and/or positively charged zeolites. As yet another example, the liquid containing the chemical charge modifiers may be a sol-gel.

The concentration of chemical charge modifiers in solution may vary. As an example, the concentration of chemical charge modifiers in solution may range from about 0.005 to about 5 weight percent. Generally speaking, the viscosity of the liquid containing the chemical charge modifiers should be about that of water.

Liquid is removed from the chemically charge-modified permeable sheet 40 by means for applying a vacuum 36 which may be composed of one or more vacuum elements 38. The design and arrangement of the means for applying a vacuum 36 may be similar to that of the vacuum means 26.

The chemically charge-modified permeable sheet 40 may then be passed to a drying operation (not shown). Exemplary drying operations include processes which incorporate infrared radiation, yankee dryers, steam cans, microwaves, hot-air and/or through-air drying techniques, and ultrasonic energy.

The chemically charge-modified permeable sheets of the present invention can be used as filter media for removing negatively charged materials from aqueous solutions. The chemically charge-modified permeable sheets may also be used as a substrate for holding appropriately charged particles, charged microencapsulated material, charged biofunctional materials and the like.

For example, microencapsulated charge-modified particles may be added to the chemically charge-modified permeable sheet. Encapsulated charge-modified particles can bond or adhere to oppositely charged areas of chemically charge-modified permeable sheets to provide an even greater variety of properties or attributes. Flavors, fragrances, drugs, pesticides, bioactive agents, colorings, skin conditioners, adsorbents, absorbents, bleaches, cleaners, and the like may be encapsulated and added to chemically charge-modified permeable sheets. Conventional encapsulation techniques such as, for example, spray coating, wall deposition from solution, interfacial polymerization, matrix solidification and centrifugal methods may be used to encapsulate materials. The encapsulated materials may have a characteristic charge or may be charge modified prior to being applied to the chemically charge-modified permeable sheet.

As another example, zeolites or zeolitic materials may be added to the chemically charge-modified permeable sheet. Generally speaking, the term "zeolite" refers to molecular-sieve zeolites that are crystalline aluminosilicates of group IA and Group IIA elements such as sodium, potassium, magnesium, and/or calcium. Molecular-sieve zeolites may be natural zeolite minerals or synthetic zeolites. Natural zeolite minerals include, but are not limited to, analcime, chabazite, clinoptilolite, erionite, faujasite, harmotome, heulandite, mordenite, natrolite, philipsite, scolecite, and stilbite. Synthetic zeolites include, but are not limited to, zeolite A, zeolite X, zeolite Y, and zeolite L. Generally speaking, zeolites are complex, crystalline inorganic polymers based on an expansive extending framework of $AlO_4$ and $SiO_4$ tetrahedra linked to each other by the sharing of oxygen ions. This framework contains channels or interconnected voids which, when empty, presents a host structure permeated by micropores that may amount to 50% of the crystals by volume. The zeolites may have a characteristic charge or may be charge modified prior to being applied to the chemically charge-modified permeable sheet.

As yet another example, clays or clay minerals may be added to the chemically charge-modified permeable sheet. Generally speaking, the terms "clays" or "clay minerals" refer to minerals of the smectite group (often referred to in early literature as the "montmorillonite" group). Clay minerals of the smectite group include, but are not limited to, montmorillonite, beidellite, nontronite, hectorite, saponite, and sauconite. Generally speaking, clay minerals of the smectite group are particles, grains and crystals having a layered or sheet-like structure. These clay minerals typically contain Al, Mg, Na, Si, O, and are hydrated, although other elements may be present. For example, montmorillonite has the general formula $[Al_{1.67}Mg_{0.33}(Na_{0.33})]Si_4O_{10}(OH)_2$. Cations (e.g., Na, Ca, K) may be sorbed between the layers. Clay minerals are composed of extremely fine particles, grains and crystals often having a diameter of less than about 4 microns.

EXAMPLES

Aqueous Amphiphilic Macromolecule Solutions

Aqueous solutions of an amphiphilic macromolecules (i.e., amphiphilic proteins) were prepared for an exemplary method of coating a permeable sheet with amphiphilic proteins. The solution composition was as follows:

Nonfat Milk: Carnation® Natural Nonfat Dry Milk (Nestle Food Company) as obtained from local grocery stores was added to hot water (approximately 55°–80° C.) to form various weight percent (0.01, 0.1, 1, 2.5, 8.0) solutions. Water was heated simply to aid in dissolution of the nonfat dry milk. Care was taken to keep the water temperature below 80° C. to avoid reprecipitating the milk solution. Milk solutions were stirred until all solids were dissolved and then stored in a refrigerator until use. Solutions were warmed to room temperature prior to exposure to nonwoven materials. 2.5 percent, by weight, nonfat milk solutions were used as the standard solution for surface modification. Other solutions were used in the study of the concentration dependence of the milk protein deposition.

Solution Contact With A Permeable Substrate
(Protien Deposition)

Vacuum Extraction: The standard procedure used for preparation of protein-coated permeable substrates is described below, and unless otherwise noted, all procedures used (i) the aqueous amphiphilic protein solutions described above; and (ii) a nonwoven web of meltblown polypropylene fibers (referred to as "PP MB") having a basis weight of about 0.5 ounces per square yard (osy) (about 17 gsm) available from Kimberly-Clark Corporation. A disk of the polypropylene meltblown nonwoven web having a diameter of about 49 mm was placed in a Buchner funnel over a vacuum flask. Approximately 100 mL (milliliters) of the 2.5 percent, by weight, nonfat milk solution at room temperature was introduced into the funnel and passed through the disk of polypropylene meltblown web with the aid of an applied vacuum (e.g., the house vacuum was approximately 13 psi). In general, the nonfat milk solution wet the polypropylene web for a total exposure time of less than 1 second. The polypropylene web was rinsed with 100 mL of distilled water in the same vacuum extractor apparatus and dried at ambient conditions. Dry add-ons (i.e., the weight of the protein coating) for these small samples were negligible and therefore not recorded.

Solutions Used for Charge Modification

Milk-protein-treated polypropylene PP MB was further treated with cationic species such as $Ca^{2+}$, $Al^{3+}$, $Bi^{3+}$, AlO(OH) (boehmite, in sol-gel form), and $Bi(OH)_3$, to produce positively-charged surfaces for particle filtration application. Adsorption of the positive species was confirmed using X-ray photoelectron spectroscopy (referred to as "XPS"). Milk-protein-treated PP MB was prepared as described above. The other solutions used for charge modification are described below:

Aluminum cation: A 500 part per million (ppm) $Al^{3+}$ solution, made by diluting (with deionized water) a 10,000 µg/ml aluminum (in HCl) ICP/DCP standard solution (Aldrich Chemical Company), was adjusted to pH 4.2 with sodium hydroxide (NaOH). This solution was used in a study to determine the most efficient method for charge modifying a milk-protein-treated PP MB substrate.

Aluminum cation/nonfat milk: A 200 ppm $Al^{3+}$, 2.5 wt % nonfat milk solution was prepared by adding 0.1049 g anhydrous aluminum sulfate ($Al_2(SO_4)_3$) to 100 g of the nonfat milk solution and stirring for 10 minutes. This was nearly the maximum amount of aluminum sulfate that could be added directly to the nonfat milk solution without causing flocculation. The final pH of the solution was approximately 6.0. This aluminum/milk solution was also used in the study to determine the most efficient method of charge modifying milk-protein-modified PP MB substrates.

Aluminum cation: A 1000 ppm $Al^{3+}$, 200 mM sodium acetate solution with a pH of 5.0 was prepared by dissolving 13.6 g sodium acetate ($NaCH_3CO_2$) in 450 mL deionized water and adding 50 mL of a 10,000 µg/mL aluminum ICP/DCP standard solution. Sodium acetate was used to prevent the flocculation caused by raising the pH with hydroxide. Maintaining a pH of 5 increases the incorporation of the aluminum into the milk-protein coating by maintaining sufficient ionization of the carboxylate groups of the protein; pH values of at least 4 were therefore used for the other modifications as well.

Bismuth cation: 1000 ppm bismuth solutions (as $Bi^{3+}$) were prepared by dissolving 27.2 g sodium acetate in 900 mL deionized water and adding 50 mL of 10,000 µg/mL bismuth ICP/DCP standard solution. The resulting precipitate was redissolved by adjusting the pH from 4.8 to 4.0 using acetic acid. The solution remained clear after the addition of another 50 mL of the bismuth ICP/DCP standard solution, and its pH was raised from 3.7 to 4.2 with sodium acetate, used to prevent the flocculation caused by raising the pH with hydroxide.

Bismuth Hydroxide: A 1000 ppm bismuth, 200 mM sodium acetate solution was prepared by dissolving 27.8 g sodium acetate in 900 mL deionized water, adding 100 mL of the bismuth ICP/DCP standard solution, and adjusting the pH to 4.1 with acetic acid. This preparation method yielded a precipitate which was readily suspended in solution for filter media preparation.

Iron/Magnesium Hydroxide: A mixed metal solution (Fe/Mg) was also prepared and used as a modification. 58.54 g of magnesium sulfate ($MgSO_4 \cdot 7H_2O$) and 3.48 g of iron sulfate ($FeSO_4 \cdot 7H_2O$) were dissolved in 250 mL of Milli-Q deionized water. The solution was heated and stirred for approximately two hours and reached a final temperature of 72° C. before it was diluted (1/10) with deionized water and exposed to the milk-protein-treated PP MB. NaOH (0.8N, 80.5 g NaOH dissolved in 500 mL Milli-Q deionized water and diluted 1/5 before use) was also used during the filter media preparation, as described below.

Charge Modification of Milk-Protein-Treated PP MB

The standard method of preparing the charge-modified, milk-protein-treated samples involved passing an aliquot of the cationic species solution through a protein-treated PP MB followed by a copious deionized water rinse and drying under ambient conditions. Several different cationic species were incorporated into milk-protein coatings to demonstrate the flexibility of the charge-modification process. Incorporation of the positive species was confirmed using XPS and field emission secondary electron microscopy (FESEM). FESEM is well-suited for determining the morphology of the coating on individual nonwoven fibers. Unlike conventional SEM, FESEM does not require a conductive, vapor deposited gold coating to eliminate sample charging. FESEM uses low analysis voltages, and the sample can be examined "as is", with no preparation other than simple mounting. The specifics of each preparation are noted below:

Different Charge Modification Methods

Soak: A milk-protein-treated PP MB sample was dried and then soaked for one hour in a 500 ppm $Al^{3+}$ solution with a pH of 4.2. The sample was then soaked in approximately 20 mL of water for 5–10 minutes and dried under ambient conditions.

One-Step Vacuum Extraction: An aliquot (100 mL) of an approximately 200 ppm $Al^{3+}$, 2.5 wt % nonfat milk solution was passed through one layer of 0.5 osy PP MB in a 49-mm-diameter buchner funnel apparatus, followed by vacuum extraction of 100 mL of deionized water. The sample was dried under ambient conditions.

Two-Step Vacuum Extraction: A milk-protein-treated sample was prepared via standard methods and immediately exposed to three passes of a 50-mL aliquot of a 500 ppm $Al^{3+}$ solution at pH 4.2. The sample was rinsed with a 100-mL aliquot of deionized water via vacuum extraction and was dried under ambient conditions. The aluminum solution tested negative for protein (Coomassie blue protein determination) after passage through the milk-protein-treated PP MB sample.

Aluminum-Modified. Milk-Protein-Treated PP MB

Aluminum cation: Four layers of 0.5 osy PP MB were modified with milk proteins via the standard preparation procedure and were immediately exposed to three passes of a 50-mL aliquot of a 1000 ppm $Al^{3+}$, 200 mM sodium acetate solution at pH 5.0. Coomassie blue dye testing of the aluminum solution after its exposure to the milk-protein-treated sample indicated a removal of trace amounts of protein which were not quantified. The samples were rinsed via vacuum extraction of 100-mL aliquots of deionized water and were dried under ambient conditions.

Aluminum Hydroxide.: To provide ever greater durability of the aluminum charge modification, deposition of the aluminum functionality as the hydroxide form was undertaken. The two methods used to impart an aluminum hydroxide functionality on milk-protein-treated PP MB are as described below:

In Situ: A sample previously charge-modified with aluminum as described above was exposed to 30 mL of sodium hydroxide at pH 11 under vacuum extraction conditions and was subsequently rinsed with 50 mL deionized water. The sample was dried under ambient conditions.

Aluminum Sol-gel: Milk-protein-treated samples were exposed to 2.3 wt % boehmite aluminum sol-gel either by soaking the sample in the sol-gel solution at a pH of 3.8 or by twice passing a 50 mL aliquot of the sol-gel solution at a pH of 3.8 to 4.3 under vacuum extraction conditions followed by a 200 mL deionized water rinse. The pH of the aluminum sol-gel solution can be raised from 3.8 to 4.2 without precipitation by the addition of sodium acetate. Coomassie blue protein determination indicated that no protein is present in the aluminum sol-gel solution after it is passed through the milk-protein-treated sample.

Bismuth-Modified, Milk-Protein-Treated PP MB

Bismuth Cation: Two layers of 0.5 osy PP MB were modified with milk proteins via the standard procedure and were immediately exposed to two passes of a 100-mL aliquot of 1000 ppm $Bi^{3+}$ solution at a pH of 4.2, followed by a 100-mL deionized water rinse and drying under ambient conditions. 1000 ppm $Bi^{3+}$ was necessary to ensure sufficient incorporation of bismuth. Using a 500 ppm bismuth solution or a previously-used 1000 ppm bismuth solution did not result in sufficient charge modification to produce significant XPS-detectable bismuth.

Bismuth Hydroxide: Two layers of 0.5 osy PP MB were modified with milk proteins via the standard procedure and were immediately exposed to two passes of a 100-mL aliquot of 1000 ppm $Bi^{3+}$ (in the hydroxide form) at pH 4.1, followed by a 100-mL deionized water rinse. The samples were dried under ambient conditions.

Iron/Magnesium Hydroxide-Modified. Milk-Protein-Treated PP MB: Two layers of 0.5 osy PP MB (49-mm-diameter disks) were treated with milk protein via the standard procedure. An aliquot (100 mL) of the diluted Fe/Mg sulfate solution was then passed through the milk-protein-treated fabrics via vacuum extraction, followed by 100 mL of a 0.8N NaOH solution. The filter was then rinsed with approximately 10 mL deionized water and allowed to dry under ambient conditions. The PP MB assumed a yellow-orange color upon exposure to the Fe/Mg sulfate solution, and this color remained the same after exposure to the NaOH. The color was concentrated in a polka-dot pattern which corresponds to the holes of the buchner funnel used during the sample preparation.

SAMPLE CHARACTERIZATION

Charge Modification Incorporation and Homogeneity

X-ray Photoelectron Spectroscopy:

X-ray photoelectron spectroscopy (XPS) data were collected using a Surface Science Labs M-Probe ESCA with monochromatic aluminum K-alpha radiation. All samples were mounted on double-side adhesive tape and charge neutralized with a 0.5 eV electron flood. Binding energies were referenced to C(is) for hydrocarbon at 284.6 eV. XPS-detectable nitrogen was monitored to assess milk-protein modification, while surface aluminum, bismuth, iron, and magnesium were monitored to assess charge modification.

Scanning Electron Microscopy: Field emission scanning electron microscopy analyses were carried out using a Hitachi S4500 field emission scanning electron microscope.

Alizarin Staining:

Aluminum-modified, milk-protein-treated samples were stained with Alizarin Red S (Aldrich Chemical Company, Inc.) by soaking treated samples in approximately 25 mL of 200 ppm Alizarin in aqueous solution until a red color developed; samples were rinsed with water and dried under ambient conditions. The samples were examined by optical microscopy utilizing a Zeiss research compound microscope.

Presence of Protein in Charge Modification Solutions

Coomassie blue dye in phosphoric acid and methanol (Sigma Diagnostics) was used to determine if any protein was present in the solutions passed through the protein-modified PP MB. When dissolved in an acid-alcoholic medium the Coomassie blue dye reacts almost immediately with protein to form a blue-colored protein dye complex which is readily detectable visually. The spectrophotometric determination at 595 nm can detect protein in samples with protein concentrations as low as 30 ng/mL.

Charge Modification Durability

The durability of charge-modifications on milk-protein-treated PP MB was assessed by exposing the charge-modified samples to 0.02M glycine/0.02M imidazole buffer at pH 7. The samples were exposed to volumes ranging from 20 mL to 200 mL under vacuum extraction conditions by placing the one-half of a prepared filter disk on a 49-mm-diameter disk of untreated PP MB in the buchner funnel apparatus and passing the specified volume of buffer through the sample via the house vacuum. Samples were rinsed with 10–20 mL deionized water to remove any excess buffer and were dried under ambient conditions. The other half of the originally-prepared sample was retained for comparison, and XPS and particle adsorption analyses were used to assess the durability of the charge modification.

Wettability and Surface Energy

Contact Angle Measurements: Contact angles of sessile drops of whole and nonfat milk solutions on a polypropylene film were determined using a Rame-Hart, Inc. goniometer (model number 100-00 115) equipped with a videocamera.

Fluid Surface Tension Reduction: Meltblown polypropylene webs having a basis weight of 1.5 osy (51 gsm) available from Kimberly-Clark Corporation were milk-protein treated. Samples measuring approximately 2"×3" were soaked for 24 hours in 80 mL of deionized water. The surface tension of the water was measured before and after sample soaking via the DuNouy ring method to determine if wetting of the material occurred via fluid surface tension reduction or by some other mechanism.

Critical Surface Tension of Wetting Measurements: Approximations of the critical surface tension of wetting of the milk-protein-treated materials were made by testing water wettability and by using wetting tension fluids available from Pillar Technologies, Inc. of Hartland, Wis. Sessile drops of the wetting fluids were placed on milk-protein-modified meltblown polypropylene webs in order of decreasing surface tension. The surface tension of the first drop to spread on the surface of the treated web within 2 seconds yielded an approximation of the treated web's critical surface tension of wetting in dynes/cm (which may be correlated to an approximation of surface energy). See, Bennet, M. K. and Zisman, W. A.; Relation of Wettability by Aqueous Solutions to the Surface Constitution of Low Energy Solids; J. Phys. Chem., pps. 1241–1246, Volume 63 (1959).

EXPERIMENTAL RESULTS

Charge Modification

The most efficient means of affecting a charge modification to milk-protein-modified PP microfibers was assessed via XPS and particle adsorption experiments, using $Al^{3+}$ as the charge modification and the methods described in the experimental section. A red stain was observed on all of the samples stained with Alizarin Red S, with the darkest red for the sample exposed to the aluminum/nonfat milk solution in a one-step vacuum extraction process; incorporation of aluminum via all of the methods is therefore indicated. As summarized in Table 1, however, the two-step vacuum extraction process involving milk-protein deposition followed by $Al^{3+}$ solution vacuum extraction yielded a material with significant surface aluminum (XPS; 2.3 atom %).

An attempt to minimize the number of vacuum extraction steps by exposing the PP MB to an aluminum/nonfat milk solution yielded a material with no XPS-detectable aluminum, in contrast to the Alizarin staining results indicating a substantial amount of bulk aluminum. XPS experiments utilizing the argon gun to sputter off the surface of the sample might indicate if the aluminum is accessible, but they were not undertaken.

While the method using a static soak exposure to the $Al^{3+}$ solution after milk-protein modification yielded a material with characteristics similar to the vacuum extracted sample (2.3 atom % Al, $2.5 \times 10^9$ particles adsorbed), the ease of filter preparation using vacuum extraction rendered it the method of choice. Therefore, all subsequent charge modifications were conducted using the two-step vacuum extraction process.

Chemical Modification Incorporation and Homogeneity

A number of chemical charge modifications were incorporated into the milk-protein-treated PP MB to demonstrate the flexibility of the charge modification process. As demonstrated in Table 2, a series of polyvalent cations and positively-charged inorganic particles have been successfully incorporated into the milk-protein surface modification. The atom percentages of XPS-detectable elements observed (1.6% to 16.9% for the various samples) are believed sufficient to promote adsorption of negatively charged particles in aqueous solutions. An increase in the concentration of the cationic species in solution would likely render a greater level of XPS-detectable signature elements, which was observed for the bismuth solutions. A 500 ppm $Bi^{3+}$ solution did not yield any XPS-detectable Bi or particle adsorption, while a 1000 ppm $Bi^{3+}$ did.

Excellent spot-to-spot agreement in the XPS survey spectra has been observed for these samples indicating a uniform surface modification within the spatial resolution of the experiment (spot size used was 800 μm). The uniformity of the charge modification is also demonstrated by FESEM analyses indicating uniform coverage of the fibers by the inorganic particles, as shown in FIGS. 2–4.

Figure 2:
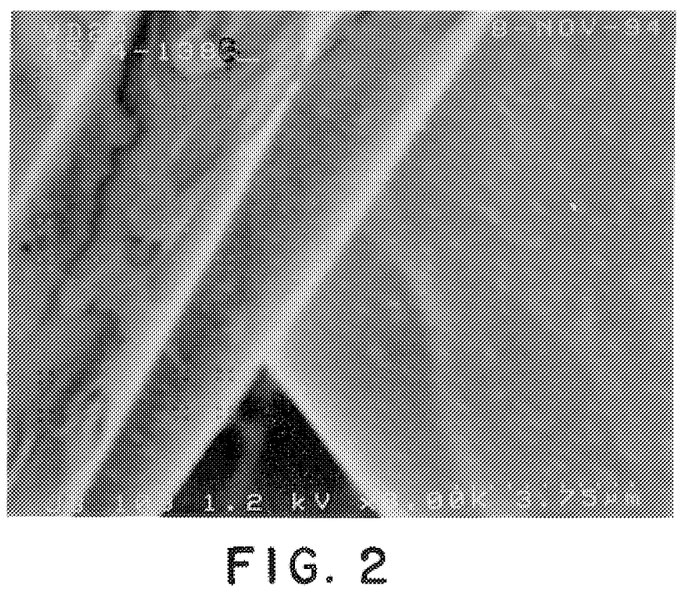
FIG. 2 is a micrograph of an exemplary chemically charge-modified permeable sheet.

FIG. 2 is an 8000× (linear magnification) FESEM micrograph of an aluminum sol-gel modified, milk-protein-treated nonwoven web of meltblown polypropylene fibers. The sample was prepared as described in the Examples section. It can be seen that the 100 nm diameter sol-gel particles are well-dispersed along the milk-protein treated polypropylene meltblown.

Figure 3:
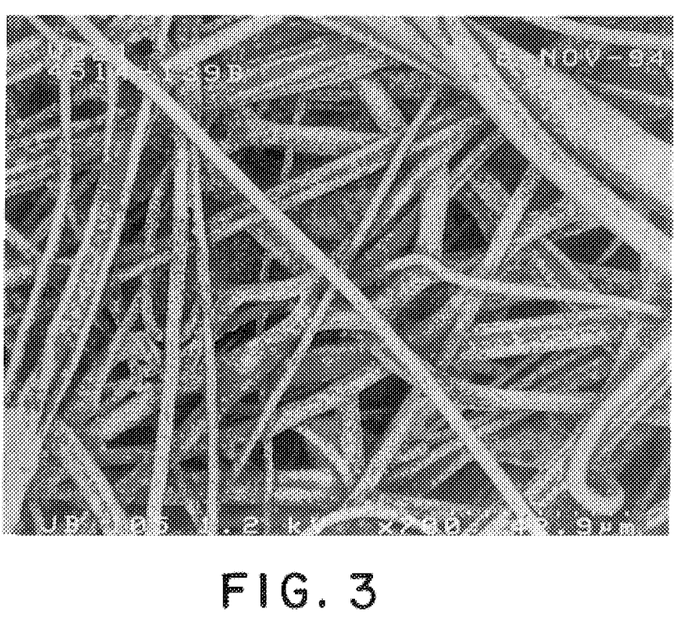
FIG. 3 is a micrograph of an exemplary chemically charge-modified permeable sheet.

FIG. 3 is a 700× (linear magnification) FESEM micrograph of bismuth hydroxide modified, milk-protein-treated nonwoven web of meltblown polypropylene fibers. The sample was prepared as described in the Examples section. Bismuth hydroxide precipitate particles seen on the fibers in FIG. 3 are approximately 500 nm in diameter and are irregularly shaped. They are well-dispersed along individual fibers and not merely trapped at fiber intersections. There are regions of greater deposition which correspond to the holes of the buchner funnel used during the deposition. An area of higher deposition is shown in this particular view.

Figure 4:
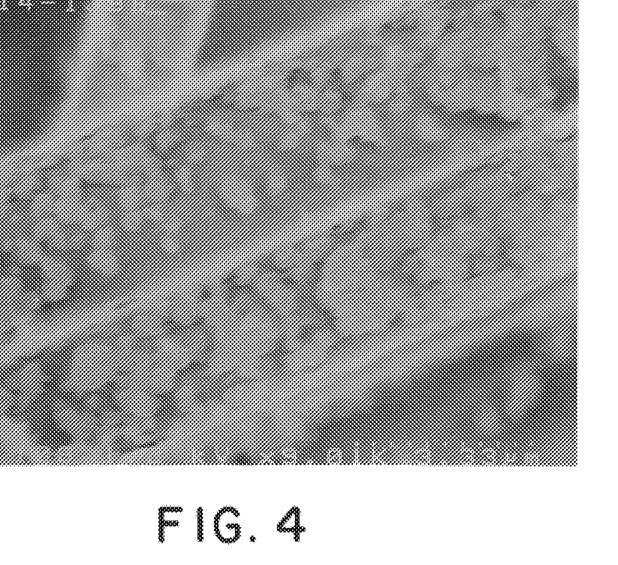
FIG. 4 is a micrograph of an exemplary chemically charge-modified permeable sheet.

FIG. 4 is a 9010× (liner magnification) FESEM micrograph of the sample shown in FIG. 3 showing a bismuth hydroxide well dispersed along individual fibers. It is quite clear from these FESEM micrographs that the incorporation of the hydroxide particles is not via physical entrapment.

Figure 5:
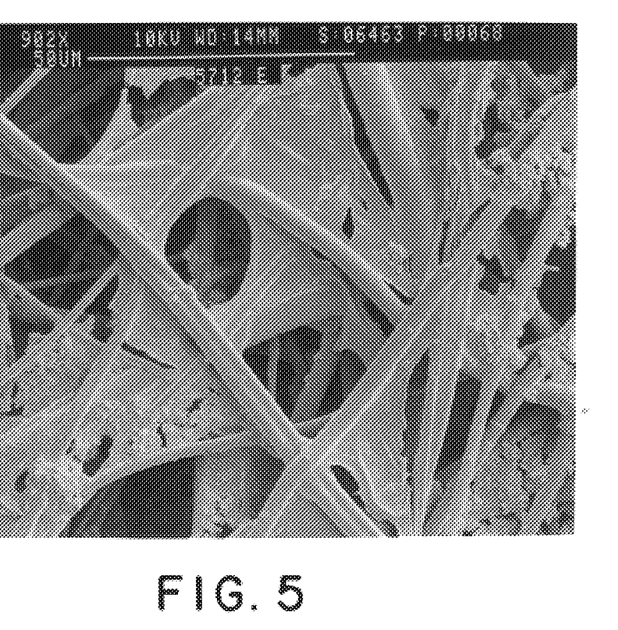
FIG. 5 is a micrograph of an exemplary chemically charge-modified permeable sheet.

Referring now to FIG. 5, there is shown a 900× (linear magnification) FESEM micrograph of iron/magnesium (Fe/Mg) hydroxides formed on the nonwoven web of polypropylene meltblown fibers in situ as described in the Examples section. This sample does not exhibit the dispersion over the fiber surface as is seen in FIGS. 2–4. The particles are primarily found at fiber intersections instead of along individual fibers. This may be due to generally larger sizes of the $Fe(OH)_3Mg(OH)_2$ particles and/or aggregates which may inhibit or constrain the interactions that produce generally uniform dispersion along individual fibers. It is thought that use of smaller sized particles and/or aggregates may provide satisfactory amounts of uniform dispersion along individual fibers.

Although the inventors should not be held to a particular theory of operation, the incorporation of cationic species into the milk-protein coating is likely mediated by electrostatic interactions between the negatively-charged phosphoserine and carboxylated amino acid residues of the protein and the positive species in solution. The fact that a variety of charge modifications can be incorporated into the milk-protein treatment indicates the flexibility of the process.

Durability of Charge Modifications

Buffer washes of charge modified materials have been conducted to assess the durability of the charge modifications. As shown in Table 3, the deposition of an insoluble form of aluminum as the aluminum sol-gel increases the durability of the charge modification over the deposition of $Al^{3+}$ or the formation of $Al(OH)_3$ in situ. While the $Al(OH)_3$ (1.3 atom % Al via XPS) modifications are not substantive to a buffer wash, the aluminum sol-gel modification (17.0 atom % Al) is, maintaining XPS-detectable levels of Al of 15.0 atom %.

Table 4 illustrates the durability of the $Bi(OH)_3$ modification in comparison to the AlO (OH). The samples have XPS-detectable levels of Al and Bi of 11.2 and 1.6 atom %, respectively.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

TABLE 1

Different Methods of Charge Modification of Milk Protein Treated PP MB
(Aluminum Ion Modification)

| | XPS Atom Percentages | | | |
|---|---|---|---|---|
| Method | Al(2s) | N(1s) | C(1s) | O(1s) |
| No Al | ND[1] | 11.8 | 72.6 | 15.6 |
| Soak[2] | 2.6 | 9.6 | 71.6 | 15.6 |
| One-Step Vac. Ext.[3] | ND | 12.7 | 69.8 | 17.5 |
| Two-Step Vac. Ext.[4] | 2.3 | 9.2 | 70.3 | 18.2 |

[1]Not Detected (i.e., less than 0.5 atom percentage via XPS)
[2]A milk-protein-treated sample was soaked in a 500 ppm $Al^{3+}$ solution with a pH of 4.2 for one hour, followed by a deionized water soak (10 minutes).
[3]An unmodified 0.5 osy PP MB sample was treated with 100 mL of a 2.5 wt % nonfat milk solution containing 0.1049 g aluminum sulfate ($Al_2(SO_4)_3$) via the vacuum extraction method, followed by a 100-mL deionized water rinse.
[4]A milk-protein-treated sample was exposed to 50 mL of a 500 ppm $Al^{3+}$ solution with a pH of 4.2 via vacuum extraction (three times), and rinsed with 100 mL of deionized water.

TABLE 2

Charge Modifications of Milk Protein Treated PP MB

| | | XPS Atom Percentages[1] | | |
|---|---|---|---|---|
| Sample | % Element | N(1s) | C(1s) | O(1s) |
| Milk protein treated control | N/A | 10.6 | 76.2 | 13.2 |
| $Al^{3+}$ modification | 2.0 (Al) | 9.5 | 73.3 | 15.3 |
| AlO(OH) modification | 16.9 (Al) | 3.7 | 45.0 | 34.5 |
| $Bi(OH)_3$ modification | 4.2 (Bi) | 8.9 | 67.5 | 19.5 |
| $Bi^{3+}$ modification | 0.4 (Bi) | 8.5 | 78.4 | 12.6 |
| Fe/Mg hydroxide modification | 1.6 (Fe) 2.7 (Mg) | 7.0 | 65.8 | 18.7 |

[1]All values reported are the average of two measurements, except the Fe/Mg hydroxide samples, which are the average of five measurements.

TABLE 3

Durability of Aluminum Hydroxide Charge Modifications

| | XPS Atom Percentages | |
|---|---|---|
| Sample | Initial, Al(2s) | Final, Al(2s)[1] |
| In situ preparation[2] | 1.3 | ND |
| Aluminum sol-gel[3] | 6.5 | 11.3 |
| Aluminum sol-gel,[4] | 17.0 | 15.0 |

[1]Charge modified samples were challenged with 0.02M glycine, 0.02M imidazole buffer rinses at pH 7 (100 mL) and rinsed with deionized water.
[2]Aluminum charge-modified, milk-protein-treated samples prepared by standard methods were exposed via vacuum extraction to 30 mL of sodium hydroxide at pH 11, and rinsed with 50 mL deionized water.
[3]Milk-protein-modified samples were exposed to 2.3 wt % boehmite aluminum sol-gel solutions under low shear conditions and rinsed with copious amounts of deionized water.
[4]Milk-protein-modified samples were exposed to 50 mL of 2.3 wt % boehmite aluminum sol-gel solutions under vacuum extraction conditions and rinsed with copious amounts of deionized water.

TABLE 4

Durability of Charge Modifications to Buffer Washes

| | XPS Atom Percentages[1] | |
|---|---|---|
| Sample | % Element Prior to Wash | % Element After Wash |
| AlO(OH) modification | 16.9 (Al) | 11.2 (Al)[2] |
| $Bi(OH)_3$ modification | 4.2 (Bi) | 1.6 (Bi)[2] |

[1]Values reported are an average of two measurements.
[2]Samples were prepared as described in the experimental section and specifically in reference 17. 50 mL of 0.02M glycine, 0.02M imidazole buffer at pH 7 were passed through one-half of the original 49-mm-diameter filter disk followed by a 20 mL deionized water rinse.

What is claimed is:

1. A method of applying chemical charge-modifiers to a permeable sheet, the method comprising the steps of:
   providing a permeable sheet having a plurality of individual exposed surfaces, at least a portion of which having a surface energy of less than about 45 dynes per centimeter, the permeable sheet having a sufficient level of permeability to allow liquid to pass through the sheet;
   providing an aqueous solution containing amphiphilic macromolecules, the solution having a surface tension of greater than about 45 dynes per centimeter;
   contacting the solution containing amphiphilic macromolecules under shear stress conditions with the permeable sheet so that at least a portion of the amphiphilic macromolecules are adsorbed onto at least some individual exposed surfaces to form a coated permeable sheet; and
   contacting the coated permeable sheet with a liquid containing chemical charge modifiers to incorporate chemical charge modifiers onto at least a portion of the amphiphilic macromolecules.

2. The method of claim 1, wherein the amphiphilic macromolecules are amphiphilic proteins.

3. The method of claim 2, wherein the amphiphilic proteins are selected from the group consisting of globular proteins and random coil proteins.

4. The method of claim 2, wherein the amphiphilic proteins are milk proteins.

5. The method of claim 2, wherein the amphiphilic proteins are milk caseins.

6. The method of claim 2, wherein the amphiphilic proteins are β-casein.

7. The method of claim 1, wherein the chemical charge modifiers are selected from the group consisting of polyvalent cations and positively-charged particles.

8. The method of claim 7, wherein the polyvalent cations are selected from the group consisting of $Ca^{2+}$, $Al^{3+}$, and $Bi^{3+}$.

9. The method of claim 7, wherein the positively-charged particles are selected from the group consisting of single metal hydroxides, mixed metal hydroxides, sol-gels, positively-charged microencapsulated materials, positively-charged latex particles, positively-charged polystyrene particles, positively-charged clays and positively charged zeolites.

10. The method of claim 1, wherein the permeable sheet is a matrix of fibrous material.

11. The method of claim 10, wherein the matrix of fibrous material is selected from the group consisting of woven fabrics, knit fabrics and nonwoven fabrics.

12. The method of claim 1, wherein the permeable sheet is an apertured film-like material.

13. The method of claim 12, wherein the apertured film-like material is selected from perf-embossed films, textured apertured films, reticulated apertured films, contoured apertured films, film-nonwoven apertured laminates, and expanded plexi-filamentary films.

14. The method of claim 1, wherein the aqueous solution is exposed to shear stress conditions characterized by a Reynold's number of at least about 200.

15. The method of claim 1, wherein the aqueous solution is substantially a foam when contacted with the permeable sheet.

16. The method of claim 1, further comprising the step of washing the coated permeable sheet with an aqueous liquid having a relatively high surface tension prior to contacting the coated permeable sheet with a liquid containing chemical charge modifiers.

17. The method of claim 1, further comprising the step of drying the charge modified permeable sheet material.

18. The method of claim 1, wherein amphiphilic macromolecules are adsorbed onto at least some individual exposed surfaces thereby defining a patterned amphiphilic macromolecule coating on the permeable sheet prior to contacting the coated permeable sheet with a liquid containing chemical charge modifiers.

19. The method of claim 1, wherein the amphiphilic macromolecules adsorbed onto at least some individual exposed surfaces define a gradient distribution of amphiphilic macromolecule coating along at least one dimension of the permeable sheet prior to contacting the coated permeable sheet with a liquid containing chemical charge modifiers.

20. A chemically charge-modified permeable sheet comprising:
 a permeable sheet having a plurality of individual exposed surfaces, at least a portion of which having a surface energy of less than about 45 dynes per centimeter, the permeable sheet having a sufficient level of permeability to allow liquid to pass through the sheet;
 amphiphilic macromolecules adsorbed onto at least some individual exposed surfaces; and chemical charge modifiers incorporated onto at least a portion of the amphiphilic macromolecules.

21. The charge-modified permeable sheet of claim 20, wherein the chemical charge modifiers are selected from the group consisting of polyvalent cations and positively-charged particles.

22. The charge-modified permeable sheet of claim 21, wherein the polyvalent cations are selected from the group consisting of $Ca^{2+}$, $Al^{3+}$, and $Bi^{3+}$.

23. The charge-modified permeable sheet of claim 21, wherein the positively-charged particles are selected from the group consisting of single metal hydroxides, mixed metal hydroxides, sol-gels, positively-charged microencapsulated materials, positively-charged latex particles, positively-charged polystyrene particles, positively-charged clays and positively charged zeolites.

24. The charge-modified permeable sheet of claim 23, wherein the single metal hydroxides are selected from the group consisting of $Al(OH)_3$ and $Bi(OH)_3$.

25. The charge-modified permeable sheet of claim 23, wherein the mixed metal hydroxide is $Fe(OH)_3Mg(OH)_2$.

26. The charge-modified permeable sheet of claim 20, wherein the amphiphilic macromolecules are amphiphilic proteins.

27. The charge-modified permeable sheet of claim 26, wherein the amphiphilic proteins are selected from the group consisting of globular proteins and random coil proteins.

28. The charge-modified permeable sheet of claim 26, wherein the amphiphilic proteins are milk proteins.

29. The charge-modified permeable sheet of claim 28, wherein the amphiphilic proteins are milk caseins.

30. The charge-modified permeable sheet of claim 29, wherein the amphiphilic proteins are β-casein.

31. The charge-modified permeable sheet of claim 20, wherein the permeable sheet is a matrix of fibrous material.

32. The charge-modified permeable sheet of claim 31, wherein the matrix of fibrous material is selected from the group consisting of woven fabrics, knit fabrics and nonwoven fabrics.

33. The charge-modified permeable sheet of claim 20, wherein the permeable sheet is an apertured film-like material.

34. The charge-modified permeable sheet of claim 33, wherein the apertured film-like material is selected from perf-embossed films, textured apertured films, reticulated apertured films, contoured apertured films, film-nonwoven apertured laminates, and expanded plexi-filamentary films.

35. The charge-modified permeable sheet of claim 20, wherein the permeable sheet is formed from a thermoplastic polymer.

36. The charge-modified permeable sheet of claim 35, wherein the thermoplastic polymer comprises a polymer selected from the group consisting of polyolefins, polyamides and polyesters.

37. The charge-modified permeable sheet of claim 36, wherein the polyolefin is selected from the group consisting of polyethylene, polypropylene, polybutene, ethylene copolymers, propylene copolymers, and butene copolymers and blends of the same.

38. The charge-modified permeable sheet of claim 20, wherein the amphiphilic proteins and chemical charge-modifiers are present at least some individual exposed surfaces thereby defining a pattern of charge-modification on the permeable sheet.

39. The charge-modified permeable sheet of claim 20, wherein amphiphilic macromolecules and chemical charge modifiers are present on at least some individual exposed surfaces to define a gradient distribution of amphiphilic macromolecule and chemical charge modifiers along at least one dimension of the permeable sheet.

40. A chemically charge-modified permeable sheet comprising:
 a permeable sheet having a plurality of individual exposed surfaces, at least a portion of which having a surface energy of less than about 45 dynes per centimeter, the permeable sheet having a sufficient level of permeability to allow liquid to pass through the sheet;
 amphiphilic proteins adsorbed onto at least some individual exposed surfaces; and
 chemical charge-modifiers incorporated onto at least a portion of the amphiphilic proteins on the individual exposed surfaces.

41. The charge-modified permeable sheet of claim 40, wherein the chemical charge modifiers are selected from the group consisting of polyvalent cations and positively-charged particles.

42. The charge-modified permeable sheet of claim 41, wherein the positively-charged particles are selected from the group consisting of single metal hydroxides, mixed metal hydroxides, sol-gels, positively-charged microencapsulated materials, positively-charged latex particles, positively-charged polystyrene particles, positively-charged clays and positively charged zeolites.

43. The charge-modified permeable sheet of claim 40, wherein the permeable sheet is a matrix of fibrous material.

44. The charge-modified permeable sheet of claim 43, wherein the matrix of fibrous material is selected from woven fabrics, knit fabrics and nonwoven fabrics.

45. The charge-modified permeable sheet of claim 40, wherein the permeable sheet is an apertured film-like material.

46. The charge-modified permeable sheet of claim 45, wherein the apertured film-like material is selected from perf-embossed films, textured apertured films, reticulated apertured films, contoured apertured films, film-nonwoven apertured laminates, and expanded plexi-filamentary films.

47. The charge-modified permeable sheet of claim 40, wherein the charge-modified permeable sheet has a basis weight of from about 6 to about 400 grams per square meter.

48. A multilayer material comprising at least two layers of the charge-modified permeable sheet of claim 40.

49. A multilayer material comprising at least one layer of the charge-modified permeable sheet of claim 40 and at least one other layer.

50. The charge-modified permeable sheet of claim 40 wherein the amphiphilic proteins and chemical charge-modifiers are present at least some individual exposed surfaces thereby defining a pattern of charge-modification on the permeable sheet.

51. The charge-modified permeable sheet of claim 40 wherein amphiphilic macromolecules and chemical charge modifiers are present on at least some individual exposed surfaces to define a gradient distribution of amphiphilic macromolecule and chemical charge modifiers along at least one dimension of the permeable sheet.

52. A method of making a chemically charge-modified permeable sheet, the method comprising the steps of:

providing a permeable sheet having a plurality of individual exposed surfaces, at least a portion of which having a surface energy of less than about 45 dynes per centimeter, the permeable sheet having a sufficient level of permeability to allow liquid to pass through the sheet;

providing an aqueous solution containing amphiphilic proteins, the solution having a surface tension greater than about 45 dynes per centimeter;

contacting the solution containing amphiphilic proteins under shear stress conditions with the permeable sheet so that at least a portion of the amphiphilic proteins are adsorbed onto at least some individual exposed surfaces to form a protein-coated permeable sheet; and contacting the protein-coated permeable sheet with a liquid containing chemical charge modifiers to incorporate chemical charge modifiers onto at least a portion of the amphiphilic proteins.

* * * * *